US006589454B1

(12) United States Patent
Santelli, Jr.

(10) Patent No.: US 6,589,454 B1
(45) Date of Patent: Jul. 8, 2003

(54) METHOD FOR MAKING EXTRUDED TEST SPECIMENS USABLE IN EVALUATING MECHANICAL AND OTHER MATERIAL PROPERTIES OF PLASTIC USED IN THE MANUFACTURE OF EXTRUDED PRODUCTS

(75) Inventor: Albert Santelli, Jr., 123 N. Mountain Ave., Bound Brook, NJ (US) 08805

(73) Assignee: Albert Santelli, Jr., Bound Brook, NJ (US)

( * ) Notice: Subject to any disclaimer, the term of this patent is extended or adjusted under 35 U.S.C. 154(b) by 0 days.

(21) Appl. No.: 09/573,331

(22) Filed: May 18, 2000

(51) Int. Cl.$^7$ .................. B29C 47/92; B29C 47/16
(52) U.S. Cl. ............... 264/40.1; 264/40.5; 264/167; 264/145
(58) Field of Search ................. 264/40.1, 40.5, 264/145, 167, 280; 425/319, 320, 321, 466, 467, 468

(56) References Cited

U.S. PATENT DOCUMENTS

| | | | | |
|---|---|---|---|---|
| 3,264,685 A | * | 8/1966 | Harris | 425/376.1 |
| 3,299,474 A | * | 1/1967 | Boggild et al. | 425/183 |
| 3,626,047 A | * | 12/1971 | Kessler | 264/145 |
| 4,209,476 A | * | 6/1980 | Harris | 264/40.1 |
| 4,418,563 A | | 12/1983 | Kalthoff et al. | |
| 4,531,401 A | | 7/1985 | Nelson et al. | |
| 4,802,366 A | | 2/1989 | Bachelder et al. | |
| 4,895,027 A | | 1/1990 | Manahan, Sr. | |
| 5,026,447 A | * | 6/1991 | O'Connor | 156/166 |
| 5,067,885 A | * | 11/1991 | Stevenson et al. | 264/285 |
| 5,342,187 A | * | 8/1994 | Ohanesian | 425/70 |
| 5,646,232 A | | 7/1997 | Marrocco, III et al. | |
| 5,762,975 A | * | 6/1998 | Rockstedt | 425/186 |

FOREIGN PATENT DOCUMENTS

GB 2236504 A * 4/1991 ........... B29C/47/12

OTHER PUBLICATIONS

Standard Test Method For Tensile Properties of Plastics; ASTM Designation: D638–91; 1/92; pp. 161–173.
Standard Test Methods For Impact Resistance of Plastics and Electrical Insulating; ASTM Designation D 256–92; 12/92; pp. 58–74.

* cited by examiner

Primary Examiner—Mark Eashoo
Assistant Examiner—Geoffrey P. Shipsides
(74) Attorney, Agent, or Firm—Duane Morris LLP

(57) ABSTRACT

An apparatus and related methods for making test specimens. The apparatus transforms a first length of a material, extruded through a die of an extruder in accordance with a predetermined set of extrusion parameters, into a second length of material useable as at least one test specimen for evaluating material properties of the material extruded according to the predetermined set of extrusion parameters. The apparatus includes a transitioning plate having an orifice defining an input opening and an output opening, the input opening having a predetermined profile area that corresponds to a profile area of an orifice of the die, the input opening for receiving material extruded through the die orifice, the output opening having a predetermined profile area corresponding to that of the at least one test specimen. The method involves aligning the orifice of the transitioning plate apparatus with the orifice of a die fitted to an extruder and using the transitioning plate to transform a first length of material, extruded through the die orifice by the extruder, into a second length of material having the desired test specimen profile area, the second length of material being useable as at least one test specimen for evaluating material properties of the material as extruded according to the predetermined set of extrusion parameters.

7 Claims, 6 Drawing Sheets

METHOD FOR MAKING EXTRUDED TEST SPECIMENS USABLE IN EVALUATING MECHANICAL AND OTHER MATERIAL PROPERTIES OF PLASTIC USED IN THE MANUFACTURE OF EXTRUDED PRODUCTS

FIELD OF THE INVENTION

This invention relates to plastic extrusion and, more particularly, to an apparatus for making test specimens which permit mechanical and other material properties of plastics used for making extruded products to be evaluated and methods relating to same.

BACKGROUND OF THE INVENTION

Extrusion is a well known process for shaping plastic products such as rods, tubes, and other simple solid and hollow shapes. During extrusion, plastic material in a highly viscous molten state is forced through an orifice of a die. Plastics which can be extruded typically include thermoplastics like polyethylene, polypropylene, polystyrene, nylon, and polyvinyl chloride, to name a few.

The manufacture of the raw plastic material involves the precise blending of various chemicals under carefully controlled process conditions. Variations of these process steps in the plastic forming process can substantially affect the mechanical properties and performance of the formed plastic product. As a result, samples from batches of plastic are routinely tested to assess the performance of the plastics from each batch.

One method which is commonly used for assessing the mechanical properties and performance of a batch of plastic is to test the reaction of the plastic to specified impact forces. The plastics industry employs an impact test performed precisely in accordance with ASTM standard #256 Method A (Izod type). In particular, the test employs a rectangular plastic specimen having a length of 2.500 inches, a width of 0.500 inches and a predetermined thickness of 0.125 inches, 0.250 inches or 0.500 inches. A V-shaped notch is formed in one edge of the plastic at a location midway along the length of the specimen. The notch is cut to a specified depth of 0.100 inches +/−0.002 inches, such that the width of the specimen below the notch is 0.400 inches +/−0.002 inches. The specimen is then securely clamped in a vise such that the apex of the notch is precisely aligned with the top of the vise. The portion of the specimen extending above the top of the vise is then impacted by a specified weight gravitationally falling through a specified arc. The particular weight employed in these tests is selected in accordance with the anticipated characteristics of the plastics being tested. The impact of the weight on the specimen is measured in appropriate units (e.g. foot-pounds/inch), with the type of break being noted and recorded (e.g. no break, partial break, hinged break or complete break). The test results of both the break type and the corresponding impact are then analyzed to determine if the plastic performed to its specifications.

The above described impact test is often performed for each batch of plastic that will used to form the desired plastic product. ASTM standards recommend that the impact tests be performed on ten specimens, with average readings then being compared to specifications.

The test specimens are typically formed by some type of conventional plastic molding process. Unfortunately, test results from molded test specimens are not particularly useful in evaluating the mechanical properties and performance of materials used for making extruded plastic products because the mechanical properties and performance of the materials are significantly affected by the extrusion process. Process variables such as the extrusion machine, the extrusion process parameters, and the die design can significantly impact the properties of the material. Thus, molded test specimens do not provide accurate information pertaining to the material properties of the plastic as they relate to extruded products.

Accordingly, test specimens are needed which permit accurate evaluation of the mechanical and other material properties of plastics used in the manufacture of extruded products.

SUMMARY OF THE INVENTION

The invention is directed to an apparatus for making test specimens. The apparatus transforms a first length of a material, extruded through a die of an extruder in accordance with a predetermined set of extrusion parameters, into a second length of material useable as at least one test specimen for evaluating material properties of the material extruded according to the predetermined set of extrusion parameters. The apparatus comprises a plate having an orifice defining an input opening and an output opening, the input opening having a predetermined profile area that generally corresponds to a profile area of the orifice of the die, the input opening for receiving material extruded through the die orifice, the output opening having a predetermined profile area corresponding to that of the at least one test specimen.

The invention is further directed to a method of using the above apparatus for making test specimens. The method comprises aligning the orifice of the above transitioning plate apparatus with the orifice of the die, and using the transitioning plate apparatus to transform a first length of material, extruded through the die orifice by the extruder, in accordance with a predetermined set of extrusion parameters, into a second length of material having the desired test specimen profile area, the second length of material being useable as at least one test specimen for evaluating material properties of the material as extruded according to the predetermined set of extrusion parameters.

BRIEF DESCRIPTION OF THE DRAWINGS

The advantages, nature, and various additional features of the invention will appear more fully upon consideration of the illustrative embodiments now to be described in detail in connection with accompanying drawings wherein.

It should be understood that the drawings are for purposes of illustrating the concepts of the invention and are not to scale.

DETAILED DESCRIPTION OF THE INVENTION

Figure 1:
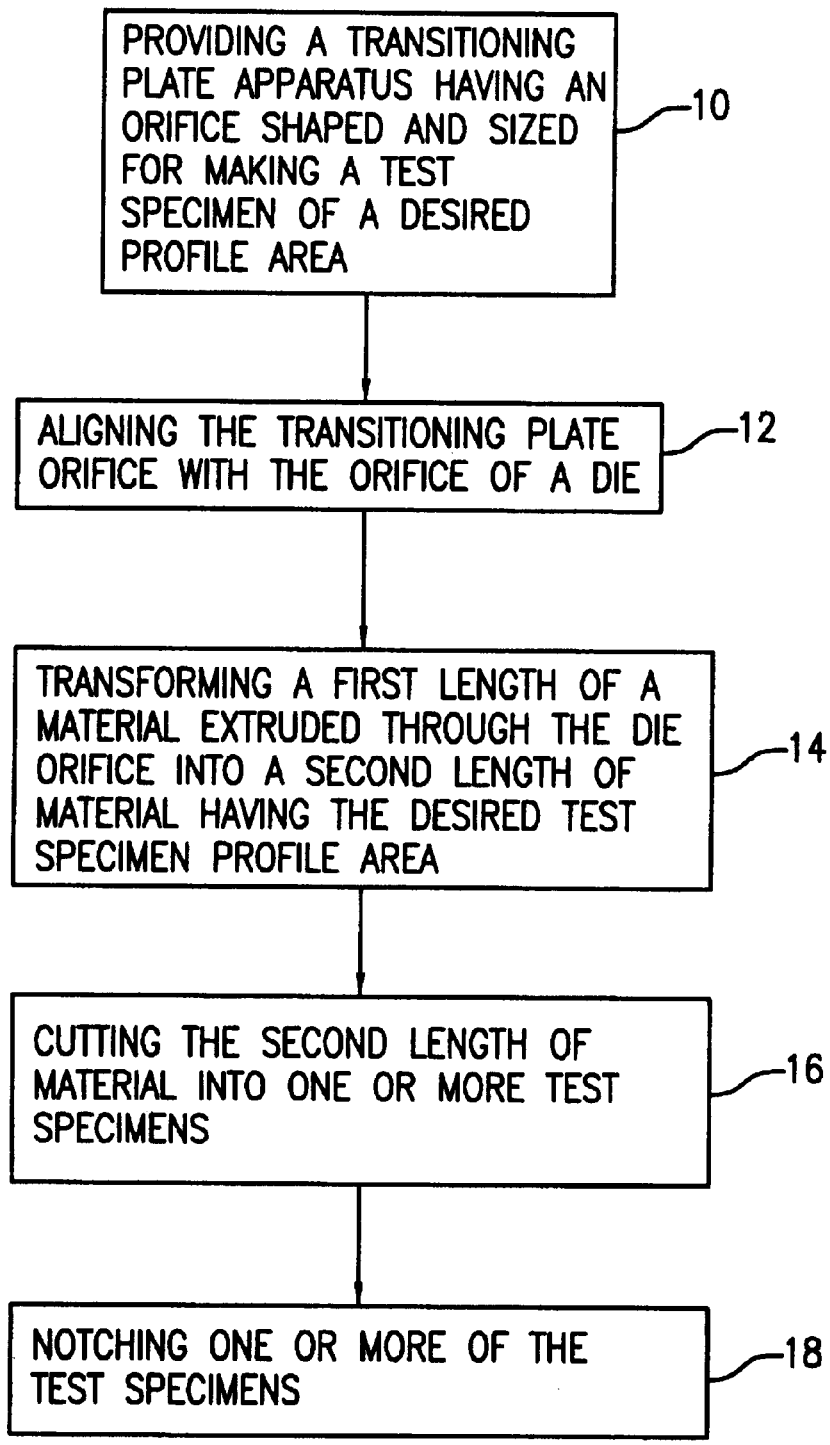
FIG. 1 is a flowchart which depicts the method of the invention.

Referring to FIG. 1, the method of the invention comprises, in step 10, providing a transitioning plate apparatus having an orifice shaped and sized for making a test specimen of a desired profile area; in step 12, aligning the orifice of the transitioning plate apparatus with an orifice of a die fitted to an extruder; and in step 14, using the transitioning plate apparatus to transform a first length of a material, extruded through the die orifice by the extruder according to a predetermined set of extrusion parameters (the first length of material will have the profile area of the desired end product), into a second length of material having the desired test specimen profile area. In step 16, the second length of material is cut into one or more test specimens and then in step 18 one or more of the test specimens are optionally notched. The transitioning plate apparatus can be used prior to, during or after the manufacture of the desired end product(s).

The predetermined set of extrusion parameters are typically the same parameters which are being used or which are being examined for use later on in manufacture of the end products. These parameters usually include the temperature of the extruder barrel during extrusion, the speed at which the material is extruded from the die, the cooling fan settings and any other parameters related to the particular extrusion process set-up used in making the end products.

The material properties of extruded plastic products are controlled by the entire extrusion process including the plastic material and the extrusion process equipment set-up. The extruded test specimens produced by the apparatus and method of the invention, operate as "snap-shots" of the entire extrusion process. In particular, the test specimens permit mechanical and other material properties of the plastics used in the manufacture of extruded products to be evaluated. Such testing is important for quality control purposes to determine if there are any significant batch to batch variations in the properties of the plastic, and/or to determine if the extrusion process set-up is correct. Testing is also important for evaluating new plastic compositions and new extrusion process set-ups. The information obtained from such testing permits one to determine if a material and/or the process set-up is capable of producing end products with desired material properties.

Figure 2:
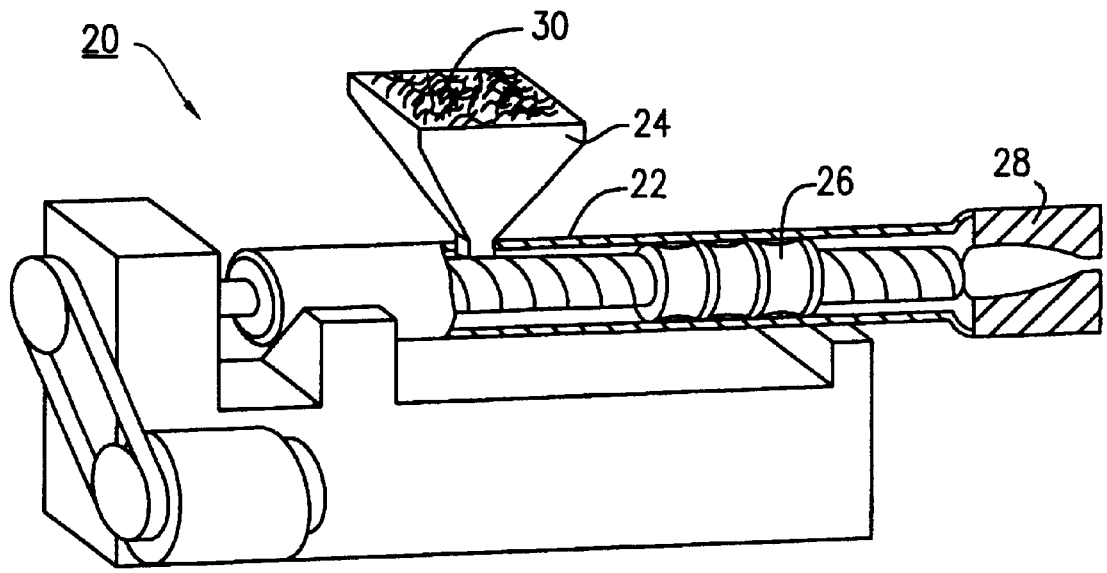
FIG. 2 is a perspective, partial sectional view of a typical extruder whose products can be evaluated using the method of the invention.

FIG. 2 depicts a typical extruder 20 which manufactures products that can be evaluated using the method of the invention. The extruder 20 is conventional and includes an electrically heated barrel 22 fed by a hopper 24. A single coarse-pitched archimedian-type screw 26 is rotatively disposed within the barrel 22 and a die 28 is attached at the far end of the barrel 22. The plastic material 30 extruded from the extruder 20 is typically in granular or in powder form, and is fed via the hopper 24 into the barrel 22. The screw 26 compacts the plastic material and forces it into contact with the interior of the barrel 22, thus generating heat which causes the plastic material to melt. The molten plastic material is then extruded through the die 28 at the far end of the barrel 22.

Figure 3:
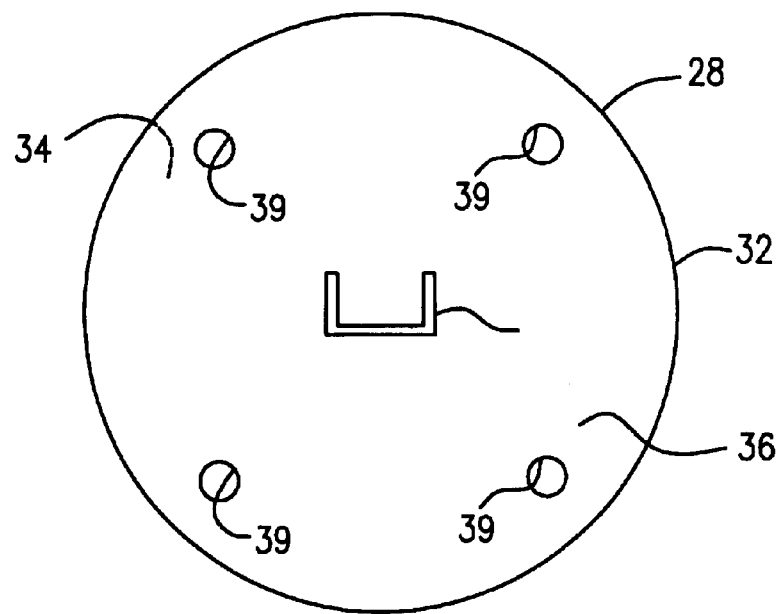
FIG. 3 is a view of the output face of the die which is attached to the extruder of FIG. 2.

As depicted in FIG. 3, the die 28 attached at the far end of the extruder barrel 22 is also conventional. The die 28 typically has a circular plate-like body 32 with an input face 34 (not visible), an output face 36 and an orifice 38 extending from the input face 34 to the output face 36, the orifice 38 having a shape which conforms the molten plastic extruded from the barrel 22 of the extruder 20 to the shape of the desired end product. The orifice 38 of the die 28 illustrated in FIG. 2, is configured to produce a channel-shaped end product. However, one of ordinary skill in the art will recognize that dies with other orifice configurations which produce solid and hollow articles of various geometrical configurations can also be used. The input face 34 of the die 28 is modified with threaded closed-ended bores 39 which allow the transitional plate apparatus 40 to be attached thereto with threaded fasteners, as will be explained further on.

Figure 4A:
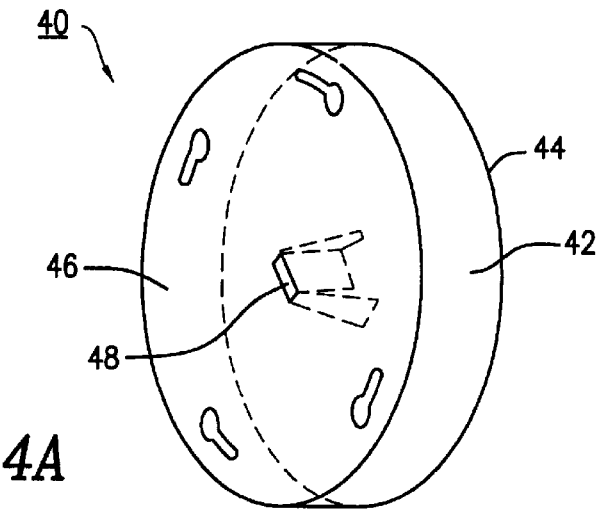
FIG. 4A is a perspective view of a transitioning plate apparatus according to a first embodiment of the invention.
Figure 4B:
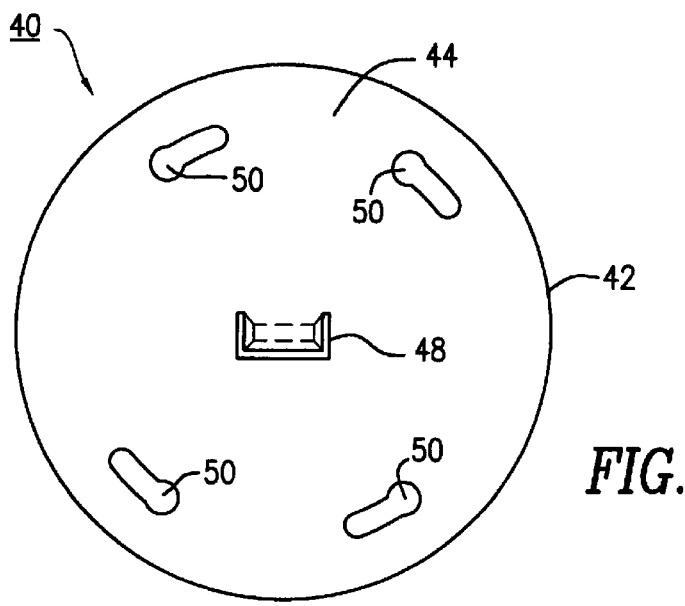
FIG. 4B is a view of the input side of the transitioning plate apparatus of FIG. 4A.
Figure 4C:
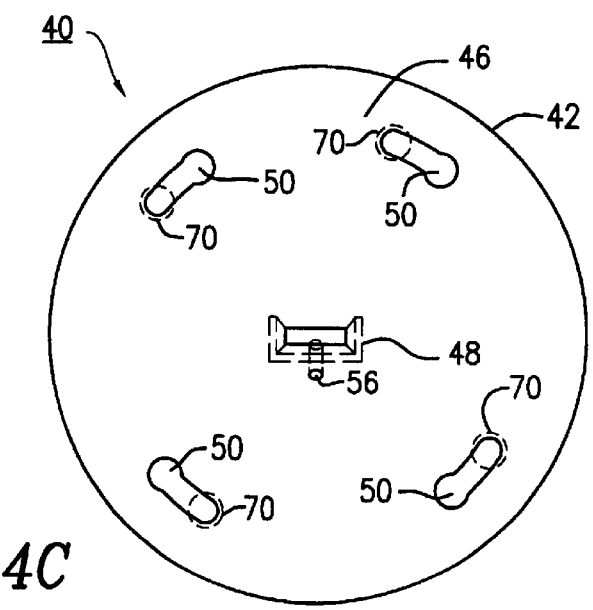
FIG. 4C is a view of the output side of the transitioning plate apparatus of FIG. 4B.

FIGS. 4A–4C depict the transitioning plate apparatus 40 according to a first embodiment of the invention. The transitioning plate apparatus 40 comprises a disc-like plate 42 having an input side 44, an output side 46 and an orifice 48 extending from the input side 44 to the output side 46 of the body 42. The apparatus 40 is adapted with elongated, arcuate apertures 50 which are keyed at one end. The keyed apertures 50 permit the apparatus 40 to be quickly attached to and removed from the die 28 with screw or like fastening means with the input side 44 of the plate 40 abutted against the output face 34 of the die 28 and the orifice 48 of the plate 40 axially and rotationally aligned with the orifice 38 of the die 28. The orifice 48 of the apparatus 40 has a shape which transitions the material extruded through the orifice 38 of the die 28 into the test specimen. This is accomplished by shaping the opening 52 of the orifice 48 on the input side 44 of the apparatus 40 (the input opening) so that it has a profile and area which generally matches that of the opening of the die orifice 38 on the output face 36 thereof. This enables the input opening 52 of the plate orifice 48 to collect all the plastic material extruded from the die 28. The plate orifice 48 gradually changes from the profile area of the die orifice 38 to the profile area of the desired test specimen (typically rectangular) at the output opening 54 of the plate orifice 48. The orifice configuration transforms the extruded plastic material collected from the die 28 into a length of material which has the desired test specimen's profile area. This length of material can be cut into one or more test specimens which are useable as is, or can be further processed by providing notches as will be explained further on.

To ensure that the material properties of the test specimens will substantially mimic those of the end products to be extruded through the die 28, the profile area of the output opening 54 of the transitioning plate orifice 48 must equal the profile area of the opening of the die orifice 38 on the output face 36 thereof. This of course is not practical if the profile area of the end product is greater than the profile area of test specimen. This problem is addressed in the invention by providing one or more bleed orifices 56 that extend from the interior of the orifice 48 to the periphery 58 or output side 46 of the apparatus 40. The bleed orifice 56 has a total profile area which equals the difference between the profile area of the opening of the die orifice on the output face 36 thereof and the profile area of the transitioning plate orifice 48. In other words, the sum of the transitioning plate and bleed orifice profile areas equals the profile area of the die orifice opening or the output face 36 thereof.

If the profile area of the transitioning plate orifice 48 is greater than the die orifice 38, the material extruded from the die 28 will usually not "fill-out" the larger plate orifice 48 to produce a length of appropriately-shaped test specimen material. This problem is alleviated in the invention by increasing the thickness T of the plate 42, which increases the length of the plate orifice 48. The longer plate orifice 48 has more internal surface area and, therefore, greater surface friction which reduces the rate of material flow through the plate orifice 48. The reduced material flow rate causes the material received from the die 28 to "fill-out" the transitioning plate orifice 48 to produce the length of test specimen material.

Figure 5:
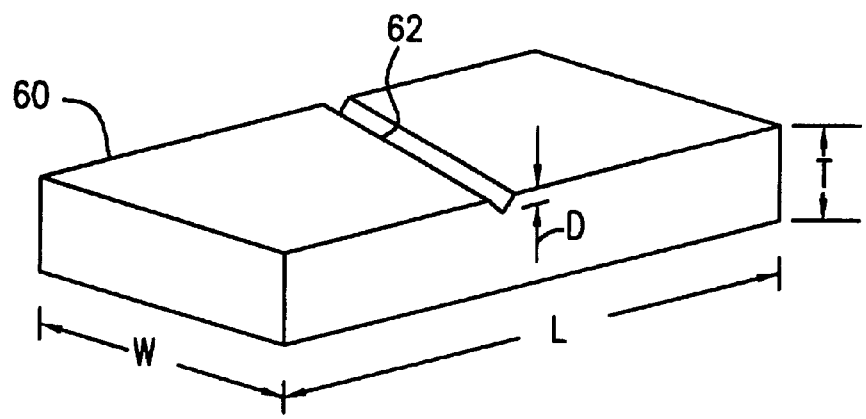
FIG. 5 is a perspective view of a test specimen made according to the invention.

In a preferred embodiment of the invention, the output opening 54 of the transitioning plate orifice 41 has a shape and profile area which produces extruded test specimens that can be used for predicting the impact or tensile strength of extruded plastic products. As shown in FIG. 5, test specimens 60 made according to the invention can be shaped and sized as prescribed by existing ASTM standards such as #256 Method A (Izod type). This test is commonly used for impact strength evaluation and prescribes a rectangular plastic specimen having a length L of 2.500 inches, a width W of 0.500 inches and a predetermined thickness T of 0.125 inches, 0.250 inches or 0.500 inches. In the optional notching step, a v-shaped notch 62 is formed on one side of the specimen at a location midway along the length thereof using any conventional method for notching plastic parts. The notch 62 is cut to a specified depth D of 0.100 inches +/−.0.002 inches, such that the width of the specimen below the notch is 0.400 inches +/−.0.002 inches. Test specimens for tensile strength evaluations can be shaped and sized as prescribed by existing ASTM standards. This test requires a rectangular plastic specimen having the same dimensions as prescribed in ASTM #256, but without the notch. Thus, the optional notching step is not used when making such test specimens.

Figure 6:
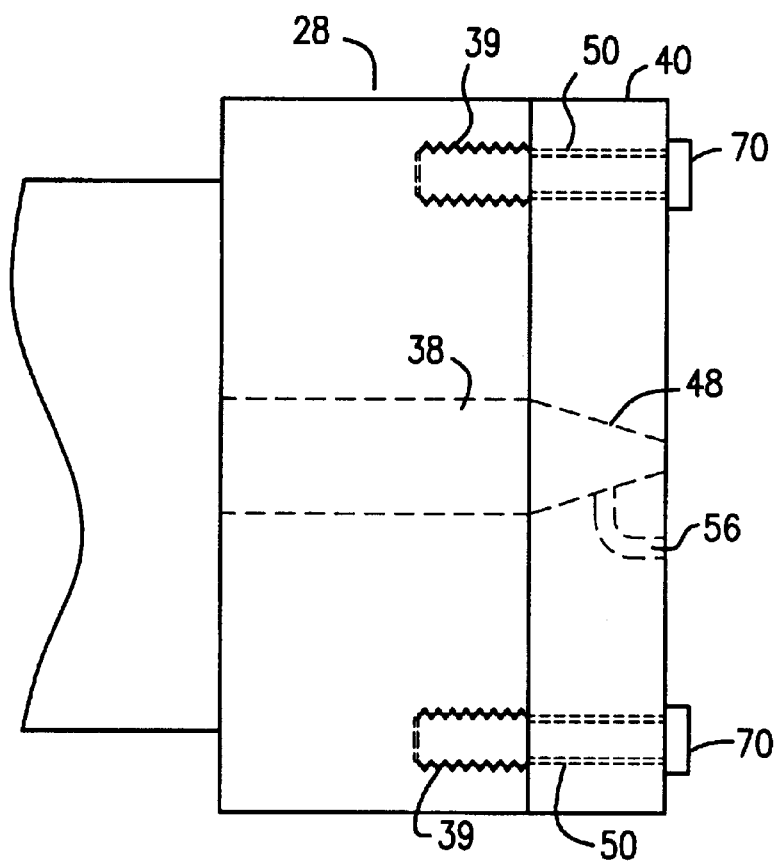
FIG. 6 is a side elevational view depicting the die fitted with the transitioning plate apparatus of the invention.

FIG. 6 depicts the die 28 fitted with the transitioning plate apparatus 40. The transitioning plate apparatus 40 is fastened to the output face 36 of the die 28 with the input side 44 of the plate 40 abutted against the output face 34 of the die 28 and the orifice 48 of the plate 40 axially and rotationally aligned with the orifice 38 of the die 28. Conventional bolts or screw fasteners 70 extend through the keyed apertures 50 and thread into the threaded closed-ended bores 39 bore in the die 28 to securely retain the transitioning plate 40 to the die 28 and maintain the axial and rotational alignments of the die and plate orifices 38, 48.

Figure 7:
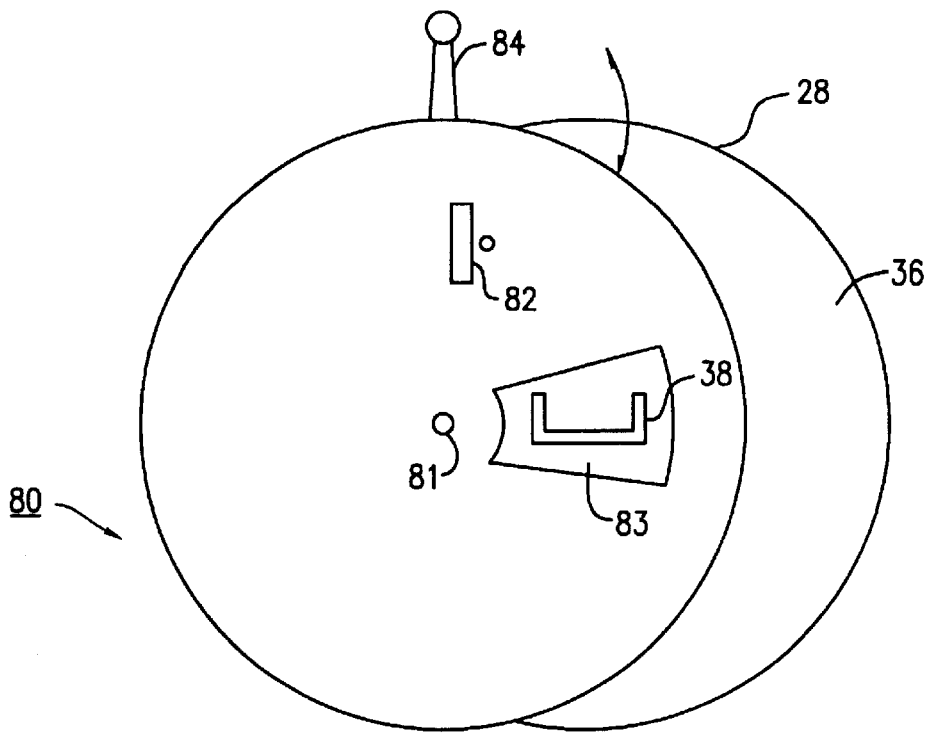
FIG. 7 is a view of the output side of a transitioning plate apparatus according to a second embodiment of the invention.

FIG. 7 depicts a second embodiment of the transitioning plate apparatus denoted by numeral 80. In this embodiment, the transitioning plate 80 is provided with an off-set transitioning orifice 82, and an offset die orifice window 83. The transitioning plate 80 is then rotatively mounted at its center to the output face 36 of the die 28 in an off-set manner and provided with a handle 84. This structure allows the transitioning plate 82 to remain attached to the die 28 during extrusion of the products. In particular, when products are to be extruded through the die 28, the handle 84 is used to rotate the transitioning plate 80 into a first position wherein the die orifice 38 is generally centered in the die orifice window 83 of the transitioning plate 80. When specimens are to be made, the handle 84 is used to rotate the transitioning plate 80 into a second position wherein the transitioning orifice 82 with the die orifice 38 are axially and rotationally aligned. Any suitable detent arrangement can be used for retaining the transitioning plate 80 in either one of the first and second positions.

Figure 8:
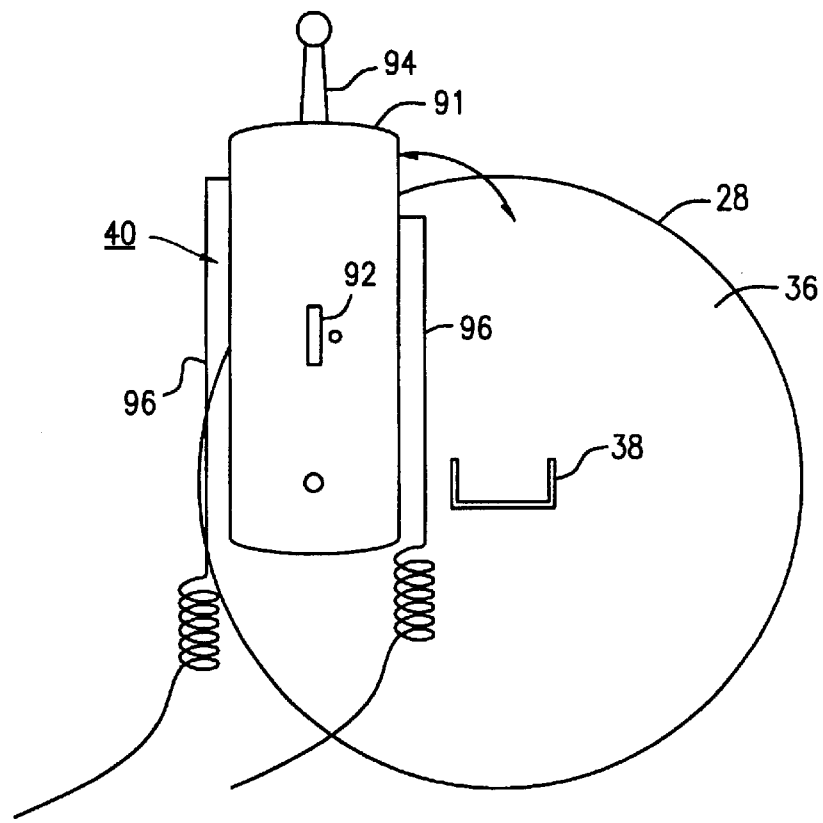
FIG. 8 is a view of the output side of a transitioning plate apparatus according to a third embodiment of the invention.

FIG. 8 depicts a third embodiment of the transitioning plate apparatus denoted by numeral 90. This embodiment of the transitioning plate 90 is substantially identical to the transitioning plate of the second embodiment except that it is constructed as a rectangular plate 91 (without the second embodiment's die orifice window) and pivotally mounted to the output face 36 of the die 28 in an off-set manner. The transitioning plate is provided with a centrally disposed transitioning orifice 92, a handle 94 and optional heating elements 96. This structure also allows the transitioning plate 90 to remain attached to the die 28 during extrusion of the products. In particular, when products are to be extruded through the die 28, the handle 94 is used to pivot the transitioning plate 90 into a first position wherein the transitioning plate 90 is out of the way of the die orifice 38. When specimens are to be made, the handle 94 is used to pivot the transitioning plate 90 across the die orifice 38 into a second position wherein the transitioning orifice 92 and the die orifice 38 are axially and rotationally aligned. Any suitable detent arrangement can be used to retain the transitioning plate 90 in either one of the first and second positions.

Figure 9:
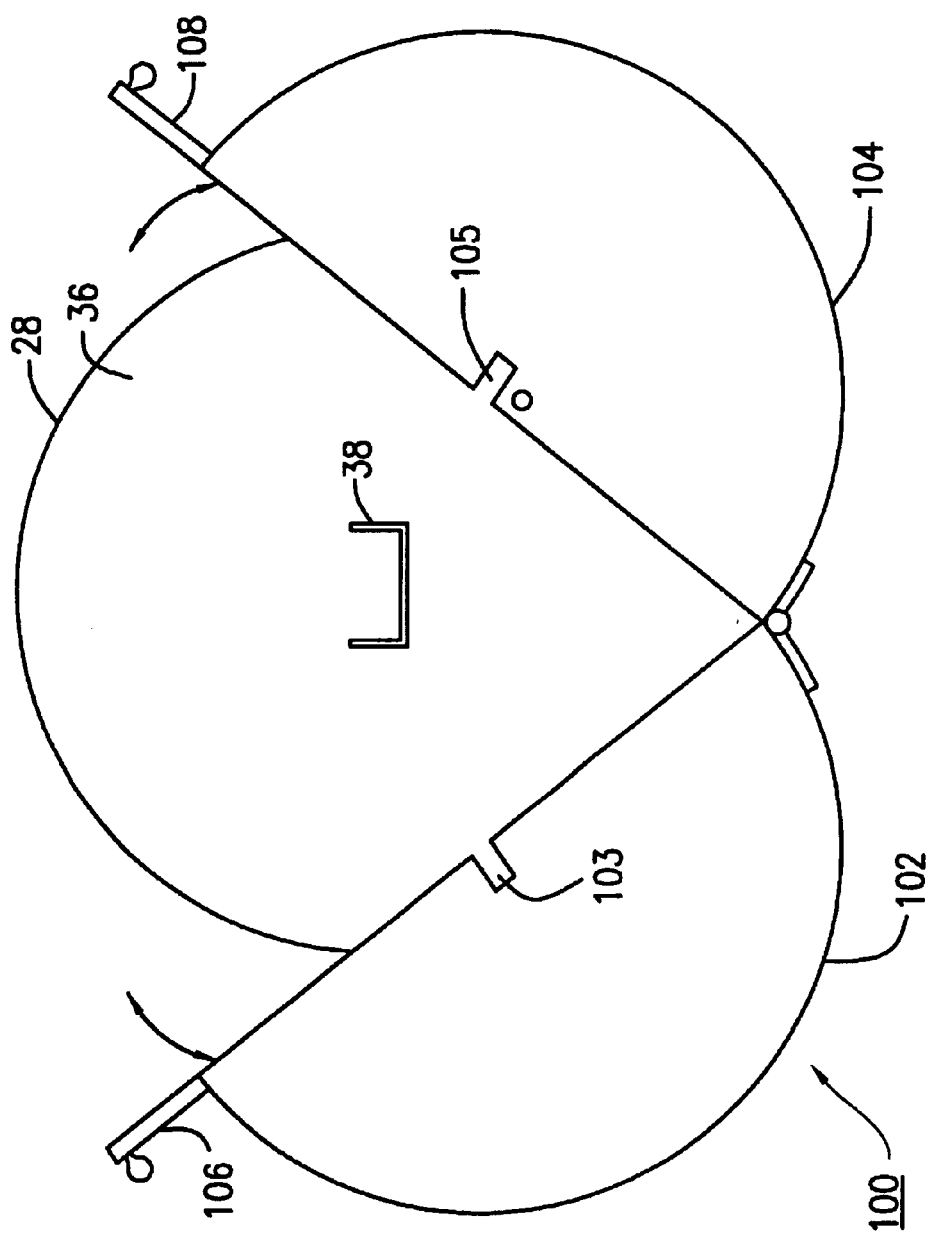
FIG. 9 is a view of the output side of a transitioning plate apparatus according to a fourth embodiment of the invention.

FIG. 9 depicts a fourth embodiment of the transitioning plate apparatus denoted by numeral 100. In this embodiment, the transitioning plate 100 is configured as two pivotally hinged sections 102, 104 which are mounted to the output face 36 of the die 28. When test specimens are needed, the plate sections 102, 104 are pivoted together across the output face 36 of the die 28 using handles 106, 108 provided on each section, and clamped together, so that test specimens can be obtained on the fly without stopping the extruder. When specimens are no longer needed, the plate sections 102, 104 are pivoted away from each other, out of the way of the die orifice 38.

Although the apparatus and method of the invention is especially useful for evaluating the mechanical and other material properties of extruded plastic products, the apparatus and method may also be useful for evaluating the material properties of other materials used in extrusion, such as aluminum.

While the foregoing invention has been described with reference to the above embodiments, various modifications and changes can be made without departing from the spirit of the invention. Accordingly, all such modifications and changes are considered to be within the scope of the appended claims.

What is claimed is:

1. A method of evaluating the material properties of a material which is currently being extruded into a part of a desired profile area or which is being examined for possible use in extruding a part of a desired profile area by an extruder operated in an extrusion process according to a predetermined set of extrusion parameters, the extruder being fitted with a die having an orifice adapted for extruding the material into the part of the desired profile area; the method comprising the steps of:

provided a transitioning plate apparatus having an orifice shaped and sized for making a test specimen of a desired profile area which is different than the desired profile area of the part;

aligning the orifice of the transitioning plate apparatus with the orifice of the die;

extruding the material through the orifices of the die and transitioning plate apparatus to generate a length of the material having the desired test specimen profile area, the length of the material being useable as at least one test specimen for evaluating mechanical properties of the material as extruded according to the predetermined set of extrusion parameters; and testing the at least one test specimen to evaluate the mechanical properties of the material.

2. The method according to claim 1, wherein prior to the aligning step, further comprising the step of extruding one or more parts of the desired profile area through the die according to the predetermined set of extrusion parameters.

3. The method according to claim 2, wherein after the testing step, further comprising the steps of:

moving the transitioning plate apparatus so that the orifice thereof is not in alignment with the orifice of the die;

resuming the extrusion of one or more parts of the desired profile area through the die according to the predetermined set of extrusion parameters.

4. The method according to claim 1, wherein after the testing step further comprising the steps of:

moving the transitioning plate apparatus so that the orifice thereof is not in alignment with the orifice of the die;

extruding one or more parts of the desired profile area through the die according to the predetermined set of extrusion parameters.

5. The method according to claim 1, wherein prior to the testing step, further comprising the step of fabricating a notch in the at least one test specimen.

6. The method according to claim 1, wherein prior to the testing step, further comprising the step of cutting the length of material into a plurality of test specimens.

7. The method according to claim 6, wherein prior to the testing step and after the cutting step, further comprising the step of fabricating a notch in at least one of the test specimens.

* * * * *